United States Patent

[11] 3,617,914

[72] Inventors Jack A. Dorler
Wappingers Falls;
Rocco Robortaccio, Fishkill, both of N.Y.
[21] Appl. No. 839,493
[22] Filed July 7, 1969
[45] Patented Nov. 2, 1971
[73] Assignee International Business Machines Corporation
Armonk, N.Y.

[54] MONOLITHIC CONSTANT VOLTAGE SOURCE
5 Claims, 3 Drawing Figs.

[52] U.S. Cl. .......... 330/23, 330/32, 330/38
[51] Int. Cl. .......... H03f 1/32
[50] Field of Search .......... 330/23, 25, 30, 38 M, 85, 86, 32; 307/303

[56] References Cited
UNITED STATES PATENTS

| | | | |
|---|---|---|---|
| 3,089,098 | 5/1963 | Noe .......... | 330/85 X |
| 3,466,559 | 9/1969 | Ruby .......... | 330/85 X |

*Primary Examiner*—Roy Lake
*Assistant Examiner*—Lawrence J. Dahl
*Attorneys*—Hanifin & Jancin and Kenneth R. Stevens ABSTRACT: A monolithic circuit constant voltage source comprising an emitter-follower amplifier and having a compensating voltage amplifier connected thereto in feedback relationship.

INVENTORS
JACK A. DORLER
ROCCO ROBORTACCIO
BY Kenneth R. Stevens
ATTORNEY

MONOLITHIC CONSTANT VOLTAGE SOURCE

BACKGROUND OF INVENTION

1. Field of Invention

This invention relates to a reference source and more particularly to a monolithic temperature compensated constant voltage source.

2. Description of Prior Art

In monolithic logic circuits it is most desirous to employ reference voltage sources having minimal variations in output voltage in order to enhance the noise tolerance of the logic circuits to which the source is connected. In other words, the ideal reference voltage source would provide a constant output voltage despite variations in temperature, component tolerance, load, and power supply.

Also, in monolithic integrated circuits it is extremely desirable to minimize the overall number of circuit components needed to perform a particular function. Such a reduction in circuit components naturally reduces power dissipation and attendant heating problems. Reducing the total number of components for a given function allows a greater number or higher density of components to be placed on a given module. Increasing the circuit or component density of an integrated circuit module greatly reduces the overall cost. Due to manufacturing tolerances inherent in monolithic processes, namely, the tolerance variations with respect to transistors as well as resistors, it becomes increasingly desirous for a reference voltage source to have the ability of withstanding these variations.

Additionally, it is desirous to employ a monolithic circuit in which temperature compensation is available. In other words, in logic circuits which employ emitter-follower outputs, an increase in temperature causes the base-emitter voltage, $V_{be}$, of the transistor to decrease and thus increase the voltage on the emitter-follower output. This action essentially shifts the up and down levels to more positive value. By employing a reference voltage source which also shows corresponding positive shifts in output voltage, in response to the temperature variations, the threshold difference between the reference voltage and the up or down level remains essentially constant, and thus a high noise tolerance is provided.

In the past, standard discrete component voltage sources are usually regulated effectively by the use of zener diodes. However, zener diodes of acceptable characteristics cannot be suitably fabricated in monolithic form and are thus unsuitable. Similarly, silicon diodes are unsuitable for use in providing a highly regulated output voltage since the diodes have the disadvantage of possessing a high negative temperature coefficient of resistivity. Additionally, when the breakdown characteristics of silicon diodes are employed to generate a controlled voltage, the output voltage ranges are limited.

SUMMARY OF THE INVENTION

It is an object of the present invention to minimize the number of components required in an improved monolithic reference voltage source.

It is another object of the invention to provide an improved constant voltage source having reduced power dissipation.

Another object of the present invention is to provide a monolithic constant reference voltage source having improved temperature variation characteristics; that is, voltage variations which are nearly zero with changes in temperature.

Another object of the present invention is to provide an improved monolithic constant reference voltage source which may be readily optimized if redesign modifications are necessary.

A further object of the present invention is to provide an improved monolithic reference voltage source which is less sensitive to beta and $V_{be}$ variations.

Another object of the present invention is to provide an improved monolithic reference voltage source which possesses a low dynamic output impedance so as to allow for increased load-handling capabilities.

A final object of the present invention is to provide a monolithic constant reference voltage source having improved load-handling capabilities coupled with good regulation despite power supply variations.

The present invention comprises a semiconductor emitter-follower amplifier stage having an input node and an output node. A semiconductor voltage compensating amplifier is connected between the input and output node in a feedback relationship in order to provide a regulated voltage at the output node. The compensating voltage amplifier includes first and second semiconductor impedance paths for changing the potential at the input node so as to maintain a desired constant output node so as to maintain a desired constant output voltage at the output node.

DESCRIPTION OF THE DRAWINGS

The foregoing and other objects, features and advantages of the invention will be apparent from the following more particular description of the preferred embodiment of the invention as illustrated in the accompanying drawings wherein.

DETAILED DESCRIPTION OF THE PREFERRED EMBODIMENT

Figure 1:
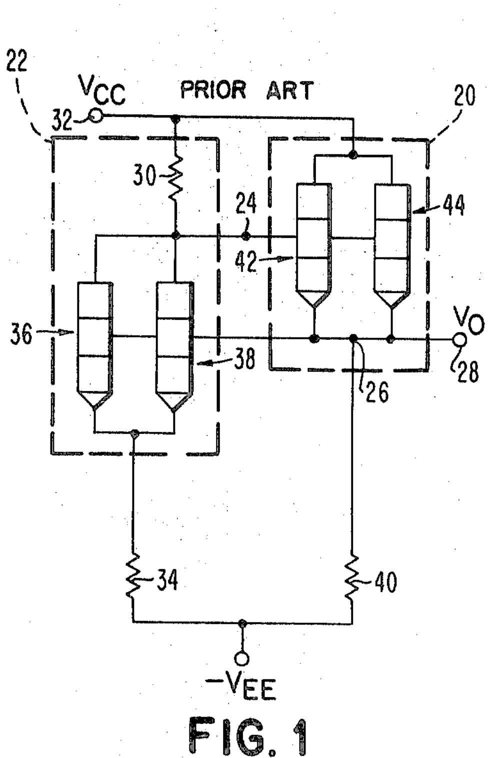
FIG. 1 is a schematic diagram of a known constant voltage source.

FIG. 1 illustrates one prior art form of a monolithic voltage source for providing a constant output voltage. The circuit includes a negative power supply, $V_{EE}$ connected to an emitter-follower amplifier stage 20 and to a temperature compensating amplifier stage 22. The emitter-follower amplifier 20 receives an input signal at input node 24 and produces an output signal at output node 26 which is connected to an output connection 28. A resistor 30 connects between input node 24 and a voltage source $V_{CC}$ connected to terminal 32. The voltage source $V_{CC}$ is positive with respect to $V_{EE}$ and may be a positive value or at ground potential. Resistor 34 is connected between double NPN transistors 36 and 38 and the source of voltage $V_{EE}$. The double transistor electrically presents a single $Y_{be}$ drop to the circuit. A load resistor 40 is connected between the double transistors 42 and 44 and the power supply $V_{EE}$.

Figure 2:
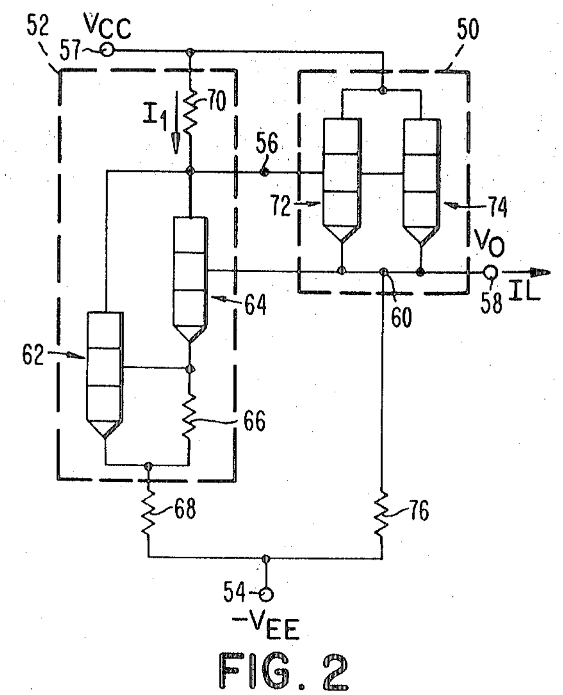
FIG. 2 is a schematic diagram of the constant voltage source of the preferred embodiment of the present invention.

In the preferred embodiment of FIG. 2, an emitter-follower amplifier stage 50 and a temperature compensating amplifier stage 52 is connected between a power supply $V_{EE}$ connected to terminal 54, and a power supply $V_{CC}$ connected to terminal 57. Supply $V_{EE}$ is negative with respect to $V_{CC}$ and $V_{CC}$ may be at ground or positive potential. In response to a signal at input node 56, the amplifier 50 generates a constant output voltage at an output connection 58 which connects to an output node 60. The compensating voltage amplifier 52 includes a first semiconductor impedance path comprising a transistor 62, and a second semiconductor impedance path comprising a transistor 64 having its emitter connected to a resistor 66. The collector electrodes of transistor 62 and 64 are commonly coupled and are connected to the input node 56. The lower portion of resistor 66 and the emitter of transistor 62 are interconnected and connected to the upper end of a biasing resistor 68. Connected between input node 56 and power supply $V_{CC}$ is a resistor 70. Double transistors 72 and 74, respectively, of emitter-follower amplifier stage 50 are connected to a load resistor 76.

OPERATION

It is known that increases in temperature will cause the base-emitter voltage drops, $V_{be}$, of the individual monolithic transistors to decrease in value. Accordingly, it can be seen that a decrease in $V_{be}$ in the circuit of FIG. 1 causes the output voltage $V_O$ on line 28 to become more positive. In other words, as the $V_{be}$ of transistors 42 and 44 decrease, the output voltage $V_O$ becomes more positive. Moreover, the compensation provided by compensating amplifier 22 is inadequate to restore the output voltage $V_O$ to its previous desired constant value. The inadequacy of the circuit to properly compensate is seen by the fact that an increased voltage on output line 28 causes transistors 36 and 38 to conduct more heavily. This increased current, due to the $V_{be}$ voltage drops in transistors 36 and 38, will tend to make the output voltage $V_O$ more negative. However, this circuit is generally undercompensated since it is limited to one $V_{be}$ drop and thus $V_O$ remains more positive than desired. In other words, compensation in this manner is severely constrained by the ranges of $V_{be}$ drops for the monolithic transistors being employed. Increasing the $V_{be}$ drops, for example, by adding a diode in series with the stage 22, (not shown) would be equally disadvantageous since this circuit would be providing two junction drops and thus would be overcompensating for temperature changes. Overcompensation would cause the output voltage $V_O$ to become more negative than desired. Additionally, the circuit of FIG. 1 is severely limited insofar as its load handling capabilities is concerned since the circuit provides a relatively high dynamic output impedance looking in from the output terminal 28. The circuit of FIG. 1 is sensitive to beta variations since current flow through resistor 30 is supplied solely by double transistors 36 and 38.

Now turning to the improved monolithic temperature compensated constant voltage source of FIG. 2, it is seen that this circuit provides improved regulation in that the voltage change at output terminal 58 is more nearly a zero value for a given temperature change. An increase in temperature will likewise cause the $V_{be}$ of transistors 72 and 74 to decrease so as to cause $V_O$ on connection 58 to become more positive. As node 60 becomes more positive, transistors 62 and 64 conduct more heavily so as to increase $I_1$ through resistor 70. The parallel connected impedance paths in stage 52 are effective to accurately control the value of current $I_1$ so as to lower the voltage at input node 56 and thus return the output voltage at connection 58 to the desired level.

Also, the circuit shown in FIG. 2 provides excellent component tolerance characteristics. Due to monolithic processing techniques, the components in a monolithic circuit have some statistical variation, two prime factors being the $V_{be}$ and beta variations. Since the $V_{be}$'s track one another, and their nominal values have a statistical variation, any spread in the $V_{be}$'s have the same effect on the output voltage, $V_0$, as temperature variations; therefore, the temperature compensation feature indirectly makes this circuit essentially independent of $V_{be}$ variations at a given temperature. Moreover, this circuit becomes less sensitive to beta variations; since the current flow through resistor 70 is not supplied entirely or only by effectively one transistor, but is divided between the paths constituting transistors 62 and 64 and resistor 66. Therefore, a variation in the beta of transistor 64 will not as greatly affect the overall current through resistor 70.

Additionally, the preferred embodiment of FIG. 2 provides increased load-handling capabilities. The load current $I_L$ is capable of supplying eight independent loads, current switch emitter-follower, with excellent regulation at a given temperature. This fact is partly attributable due to the low dynamic impedance which is seen when looking in from the output terminal 58 which in turn results in a higher feedback gain to transistors 72 and 74. This may also be viewed from the standpoint that the base emitter voltage of transistor 62 across resistor 66 essentially constitutes a constant current source.

The circuit possesses excellent regulation at a given temperature despite power supply variations in $V_{EE}$ and $V_{CC}$. Also, the circuit has the additional advantage of being readily optimized if design constraints are changed and a redesign is necessary.

Figure 3:
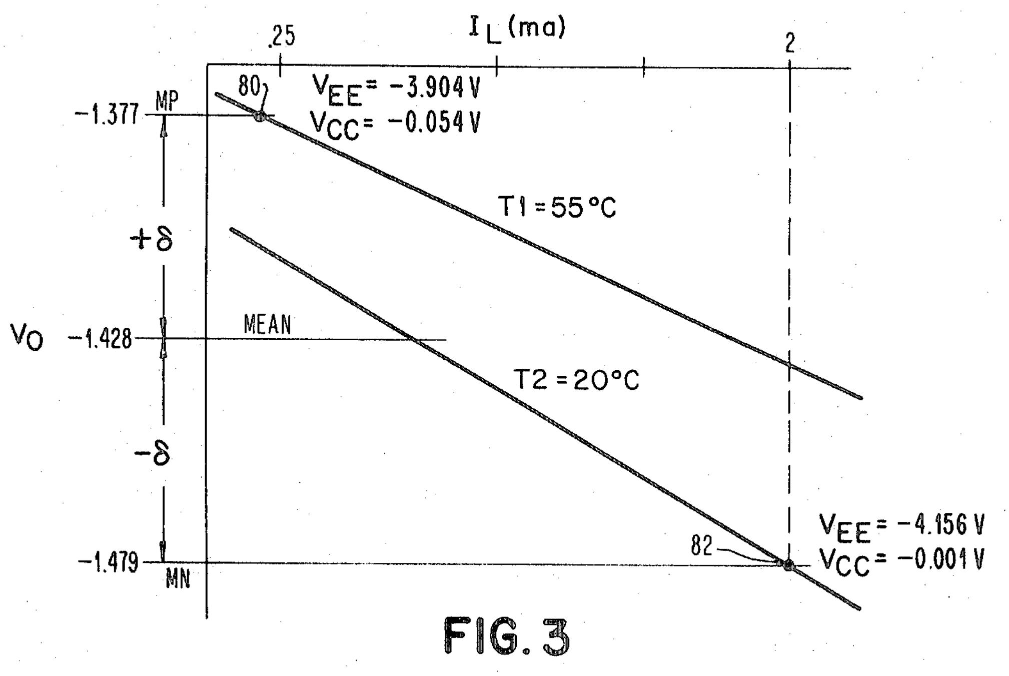
FIG. 3 is an electrical characteristic curve illustrating the output voltage variation versus output current for the circuit of FIG. 2 in two extreme or worst case situations.

The overall circuit tolerances are illustrated in the graph of FIG. 3 which show a plot of $V_O$ versus $I_L$ for two extreme conditions of temperature, and worst case voltage supply points. The upper plot indicates the extreme or most positive (MP) condition for hot temperature, and most positive $V_{EE}$ and $V_{CC}$ conditions. The lowermost plot represents a most negative (MN) condition for cold temperature, and most negative $V_{EE}$ and $V_{CC}$ conditions. It is readily seen that even for the most extreme two temperature and voltage supply conditions, excellent regulation of $V_O$ is obtained. The overall tolerance is defined by the following equation:

$$(\delta)=\frac{V_O(MN)-V_O(MP)}{[V_O(MN)+V_O(MP)]_{mean}}$$

and, where points 80 and 82, FIG. 3, represent the three sigma deviation for a statistical distribution of $V_O$ due to variations in component processing techniques for given operating conditions at MP and MN conditions of temperature and voltage supply.

The preferred embodiment, in one example, exhibited an overall tolerance for $V_O$ of approximately ±3.85 percent unoptimized and a possible ±3.5 percent optimized. Output voltage variations for $V_O$ due to the following variations were as follows: temperature (0.3 to 0.6)*mv*/°C; worst case power supply, $V_{EE}$ & $V_{CC}$ (45 to 56) *mv;* component tolerance (6 to 8) *mv*. The circuit tracks with the power supply in a ratio of $\Delta V_{EE}/\Delta V_{CC}$=1.95, with an output impedance of 5 ohms.

While the invention has been particularly shown and described with reference to the preferred embodiment, it will be understood by those skilled in the art that the foregoing and other changes in form and detail may be made therein without departing from the spirit and scope of the invention.

What is claimed is:

1. A monolithic temperature-compensated constant voltage source comprising:

a. a semiconductor emitter-follower amplifier stage having an input node, an output node constituted by an emitter terminal, and an output connection connected to said output node;

b. a semiconductor compensating voltage amplifier having an input terminal and an output terminal;

c. said input terminal being connected to said output node and said output terminal being connected to said input node;

d. said compensating voltage amplifier including a first and a second semiconductor impedance path, said first and second paths being connected in parallel and each path including at least one active element;

e. a power supply terminal connected to said emitter follower stage and to said compensating voltage amplifier, and being adapted to receive a source of power;

f. at any given temperature or below, said active elements in said first and second impedance paths being responsive to the voltages at the input and output terminals associated with the compensating voltage amplifier so as to be placed in first different relative states of conductivity for providing a first impedance value in order to maintain a desired constant output voltage at said output connection; and g. at any temperature above said given temperature said active elements in said first and second impedance paths being responsive to voltages at the input and output terminals associated with the compensating voltage amplifier so as to be placed in second different relative states of conductivity for providing a second impedance value so as to maintain said desired constant output voltage at said output connection.

2. A monolithic temperature-compensated constant voltage source as in claim 1 wherein:

a. said first path active element comprises a first transistor connected between said input node and said power supply terminal; and b. said second path active element comprises a second transistor connected between said input node and said power supply terminal.

3. A monolithic temperature compensated constant voltage source as in claim 2 wherein:

a. the collector of said second transistor is connected to said input node; and b. a first resistance means is connected between the emitter of said second transistor and said power supply terminal.

4. A monolithic temperature compensated constant voltage source as in claim 3 wherein:

a. the base-emitter terminals of said first transistor are connected across said first resistance means, and the voltage developed across said first resistance means being operative to control the conductivity state of said first transistor.

5. A monolithic temperature compensated constant voltage source as in claim 4 wherein:

a. All the transistors of the voltage source are of the same conductivity.

* * * * *